July 2, 1940.　　　A. R. KUHN　　　2,206,408
METER SOCKET
Filed Dec. 30, 1939　　　2 Sheets-Sheet 1

INVENTOR.
ALFRED R. KUHN
BY George T. Gill
ATTORNEY.

July 2, 1940.  A. R. KUHN  2,206,408
METER SOCKET
Filed Dec. 30, 1939　　2 Sheets-Sheet 2

INVENTOR.
ALFRED R. KUHN
BY
ATTORNEY.

Patented July 2, 1940

2,206,408

UNITED STATES PATENT OFFICE 2,206,408

METER SOCKET

Alfred R. Kuhn, Queens Village, N. Y., assignor to Metropolitan Device Corporation, Brooklyn, N. Y., a corporation of New York Application December 30, 1939, Serial No. 311,751

5 Claims. (Cl. 171—34)

The invention herein disclosed relates to a supporting socket or base for a watt hour meter of the type commonly known as the detachable meter.

Sockets for such meters include a ring having an outwardly extending flange to which the meter is secured and a bridge extending across the ring. Preferably, the bridge extends diametrically of the ring. The bridge supports socket contact assemblies that are spaced to receive the contact blades projecting from the detachable meter casing.

Such meter sockets have become standardized in dimensions by agreement between the manufacturers of such meters and the manufacturers of the bases for such meters. At the time the standardization was effected, these meter sockets were commonly constructed as die-castings of zinc alloys. These die-cast bases are expensive to manufacture and must be protected against the corrosive action of the elements. The protective coating applied prevents a good electrical contact between the meter and the base and so prevents a good ground connection with the meter which is made through the base.

Various attempts have heretofore been made to provide a thoroughly rigid, waterproof, inexpensive and satisfactory meter socket. This, however, has presented a definite problem because of the standardization of the dimensions of such meter sockets and the meter parts that are received in the socket. The welding and riveting of several parts together has been found to be a difficult and unsatisfactory expedient as the standard dimensions do not provide sufficient room to design and construct a base in this manner. On the other hand, such one piece constructions as have been proposed have been unacceptable because of lack of rigidity and the necessity of altering the dimensions in one or another respect.

By the invention herein disclosed there is provided a meter socket that consists of a single piece of sheet metal; that provides the necessary rigidity and weathertightness and that conforms in all respects to the standard dimensions. In accordance with the invention the meter socket is drawn from a single piece of sheet metal and it is provided with the usual supporting ring or collar, a substantially radial flange to which the meter is attached and bridge supports for the bridge to which the contact socket assembly is secured. The meter retaining flange is constructed to have a rigidity and strength at least twice as great as a single thickness of the material from which the socket is drawn.

Meter sockets illustrating specific embodiments of the invention are illustrated in the accompanying drawings in which.

Figure 1:
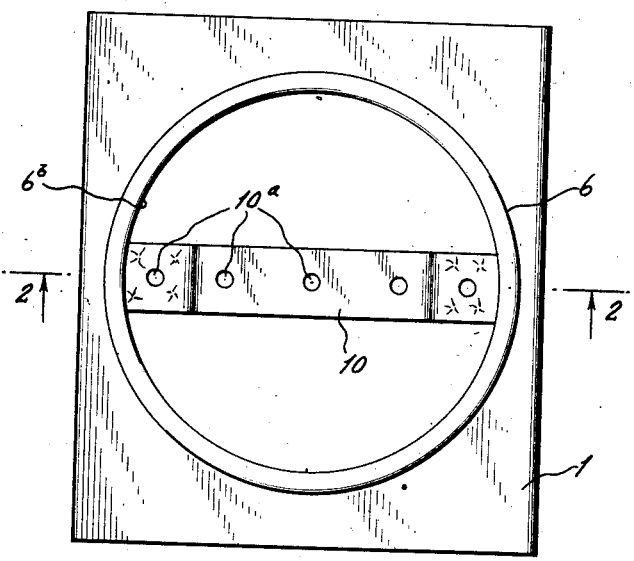
Fig. 1 is a plan of the meter socket.

The particular meter socket illustrated in the drawings is one that is especially suitable for a meter trough through which several consumers are supplied. Such meter troughs are of various lengths. They are commonly provided for multiple dwellings and there is provided within the trough connections for several meters. For each meter, however, there is provided a cover for the section of the trough in which the connections for the particular meter are provided.

The meter socket illustrated in the drawings thus includes a cover plate 1 having side flanges 2 and 2a which, when the cover is placed on a meter trough, engages the side walls 3 and 4 of the meter trough. At the center of the cover plate, there is a meter opening that is defined by a cylindrical member 5 which extends axially of the opening or perpendicular of the cover plate. At the edge of the cylindrical member, there is provided a radially outwardly extending, meter engaging flange 6. This flange includes a section 6a bent outwardly, substantially radially, from the cylindrical member and a section 6b formed by bending the metal back upon itself. Thus an integral meter engaging and supporting flange of at least double the thickness and strength of the metal is provided.

From the inner edge of the section 6b of the flange 6, diametrically opposite strips 7 and 8 extend along the inner surface of the cylindrical member past the plane of the cover plate. These strips are received in recesses, such as the recess 9 for the strip 7, in the cylindrical member. Just below the plane of the cover plate the strips 7 and 8 are bent to form inwardly extending, radial bridge-supporting strips 7a and 8a respectively. The strips 7 and 8 must be recessed as the standard dimension for the interior of the ring 5 does not permit overlapping of these strips and at the same time provide adequate clearance for the meter parts. The suggestion has been made of welding a single bridge supporting member across the ring. However, this is a difficult and unsatisfactory expedient because it is necessary to stretch the bridge to make the second weld take hold.

The meter socket and cover plate thus far described is constructed from a single piece of sheet metal. The sheet metal is drawn and bent to form the several elements arranged as illustrated in the drawings and described in detail above. To the bridge supporting strips 7a and 8a there is secured, by spot welding, a bridge 10. The bridge consists of a strip of metal that extends between and rests upon the bridge-supporting strips and includes side flanges 11 which engage the side edges of the bridge-supporting strips and serve as stiffening ribs for the bridge.

To the bridge 10 the contact socket assembly is secured by bolts passing through the openings 10a provided therefor in the bridge. The meter socket is then complete and ready to be placed upon a meter trough and connected. The meter is placed upon the meter socket in the usual way with the meter blades engaging the contacts of the contact assembly and secured to the flange 6 with the usual channel-sectioned ring.

Figure 2:
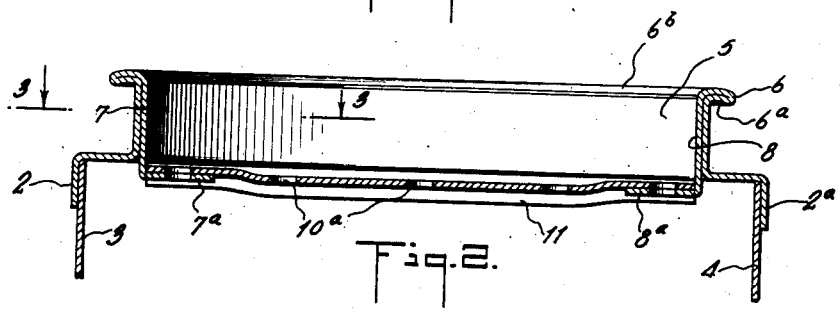
Fig. 2 is a sectional elevation taken on the line 2—2 of Fig. 1.
Figure 3:
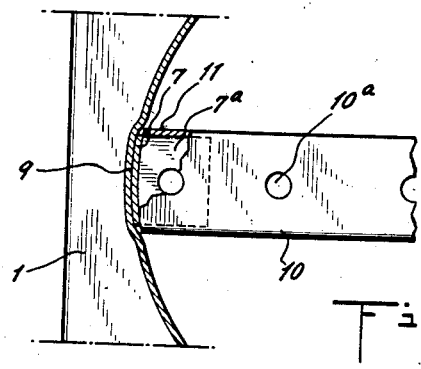
Fig. 3 is a fragmentary sectional plan taken on the line 3—3 of Fig. 2.
Figure 4:
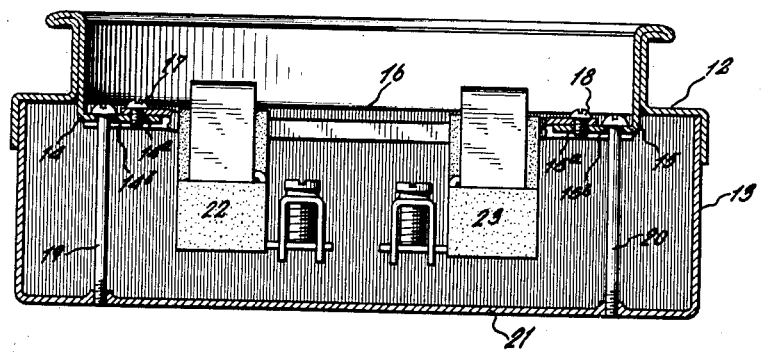
Fig. 4 is a sectional elevation of a modified form of the meter socket.

In Fig. 4 of the drawings, there is illustrated a construction in which the bridge and contact block assembly are removable as a unit. This construction includes a cover 12 for a trough 13. The cover is in all respects similar to the cover illustrated in Figs. 1 to 3 and includes bridge-supporting strips 14 and 15 formed as a part of the cover. The strip 14 has two holes 14a and 14b therethrough, one of which, the hole 14a is tapped. Similar holes 15a and 15b are provided in the strip 15.

At each end, the bridge 16 is provided with a hole corresponding to the holes 14a and 15a in the bridge-supporting strips 14 and 15. Extending through a hole in the bridge 16, there is a machine screw 17 that is threaded into the hole 14a in the strip 14. A like machine screw 18 secures the other end of the bridge to the strip 15. Through the holes 14b and 15b in the strips 14 and 15, long machine screws 19 and 20 extend and are threaded into alined tapped holes in the rear wall 21 of the trough 13.

To the bridge 16 contact blocks 22 and 23 are secured by bolts in the usual manner. Each contact block includes a pair of meter blade receiving contacts of the type common and well known in the art. The screws 19 and 20 hold the cover to the trough and the screws 17 and 18 hold the bridge 16 to the cover. By removing the screws 17 and 18 the bridge and contact blocks may be removed. Thus, with this construction, the bridge and contact block assembly may be assembled in the meter socket, removed and replaced as a unit without disturbing the cover.

From the foregoing description of the embodiments of the invention, it will be seen that there is provided a complete meter socket or base for the detachable type meter, which includes a cover plate, a cylindrical member, a meter engaging and supporting flange of double thickness and strength and bridge supports, and the base consists of a single piece of sheet metal. The only assembly operation required for the complete meter socket is securing the bridge to the supports and mounting the contact assembly on the bridge. This meter socket is unitary, complete in itself and forms a part of a cover plate which is readily placed upon a meter trough.

It will be obvious that various changes may be made by those skilled in the art in the details of the embodiment of the invention disclosed in the drawings and described in detail above within the principle and scope of the invention as expressed in the appended claims.

I claim:

1. A one-piece meter-supporting socket consisting of a single piece of sheet metal and including a cover plate having an opening therethrough, a cylindrical member extending from the plate axially of and defining the opening through the plate, a radially extending meter engaging flange extending from the edge of the cylindrical member, the flange including a section extending substantially radially outwardly from the edge of the cylindrical member and a section formed by bending the metal back upon itself, and diametrically opposite bridge supporting strips extending radially inwardly from the cylindrical member.

2. A one-piece meter-supporting socket consisting of a single piece of sheet metal and including a cover plate having an opening therethrough, lateral flanges at opposite edges of the cover plate, a cylindrical member extending from the cover plate axially of and defining the opening through the cover plate, a radially extending meter engaging flange extending from the edge of the cylindrical member, the flange including a section extending substantially radially outwardly from the edge of the cylindrical member and a section formed by bending the metal back upon itself, and diametrically opposite strips extending along the inner surface of the cylindrical member and radially inwardly to form bridge supporting strips, and a bridge extending between and secured to the strips.

3. A one-piece meter-supporting socket consisting of a single piece of sheet metal and including a plate having an opening therethrough, a cylindrical member extending from the plate axially of and defining the opening through the plate, a radially extending meter engaging flange extending from the edge of the cylindrical member, the flange including a section extending substantially radially outwardly from the edge of the cylindrical member and a section formed by bending the metal back upon itself, and diametrically opposite strips extending along and recessed in the inner surface of the cylindrical member and radially inwardly to form bridge supporting strips.

4. A one-piece meter-supporting socket consisting of a single piece of sheet metal and including a cover plate having an opening therethrough, lateral flanges at opposite edges of the cover plate, a cylindrical member extending from the cover plate axially of and defining the opening through the cover plate, a radially extending meter engaging flange extending from the edge of the cylindrical member, the flange including a section extending substantially radially outwardly from the edge of the cylindrical member and a section formed by bending the metal back upon itself, and diametrically opposite strips extending along the inner surface of the cylindrical member and radially inwardly to form bridge supporting strips, and a bridge extending between and removably secured to the strips.

5. A meter trough having a rear wall and side walls, a cover therefor consisting of a single piece of sheet metal and including a cover plate having an opening therethrough, a cylindrical member extending from the cover plate axially of and defining the opening through the plate, a radially extending meter engaging flange extending from the edge of the cylindrical member, the flange including a section extending substantially radially outwardly from the edge of the cylindrical member and a section formed by bending the metal back upon itself and diametrically opposite bridge supporting strips extending radially inwardly from the cylindrical member, means for securing the strips to the rear wall of the trough, a bridge extending between the strips and means for securing the bridge to the strips.

ALFRED R. KUHN.